United States Patent [19]

Engeler

[11] 3,746,908

[45] July 17, 1973

[54] SOLID STATE LIGHT SENSITIVE STORAGE ARRAY

[75] Inventor: William E. Engeler, Scotia, N.Y.

[73] Assignee: General Electric Company, Schenectady, N.Y.

[22] Filed: Aug. 3, 1970

[21] Appl. No.: 60,767

Related U.S. Application Data

[63] Continuation-in-part of Ser. No. 845,435, July 28, 1969, abandoned.

[52] U.S. Cl. .................. 315/10, 178/6.8, 317/235 N

[51] Int. Cl. .............................................. H01j 31/26

[58] Field of Search ............................. 315/10, 149; 178/6.8; 250/208, 216; 313/65; 148/175; 317/235 N

[56] References Cited

UNITED STATES PATENTS

| | | | |
|---|---|---|---|
| 3,575,823 | 4/1971 | Gordon | 317/235 N |
| 3,403,284 | 9/1968 | Buck et al. | 315/10 X |
| 3,296,040 | 1/1967 | Wigton | 148/175 |
| 3,011,089 | 11/1961 | Reynolds | 315/10 |
| 3,548,233 | 12/1970 | Cave et al. | 315/10 X |
| 3,564,309 | 2/1971 | Hoeberechts et al. | 315/10 X |

*Primary Examiner*—Carl D. Quarforth
*Assistant Examiner*—E. E. Lehmann
*Attorney*—John F. Ahern, Paul A. Frank, Jerome C. Squillaro, Frank L. Neuhauser, Oscar B. Waddell and Joseph B. Forman

[57] ABSTRACT

An improved electron beam information storage device is disclosed as comprising a target structure having an array of closely spaced diodes with electrically conducting self-registered projections in contact with the diodes and extending away from the surface of the diode array for intercepting the electron beam and conducting electrons to the diodes thereby preventing an undesirable charge buildup on the surface of target structure. A method for making storage devices by selective epitaxial growth is also disclosed.

17 Claims, 2 Drawing Figures

Patented July 17, 1973 3,746,908

Figure 1:
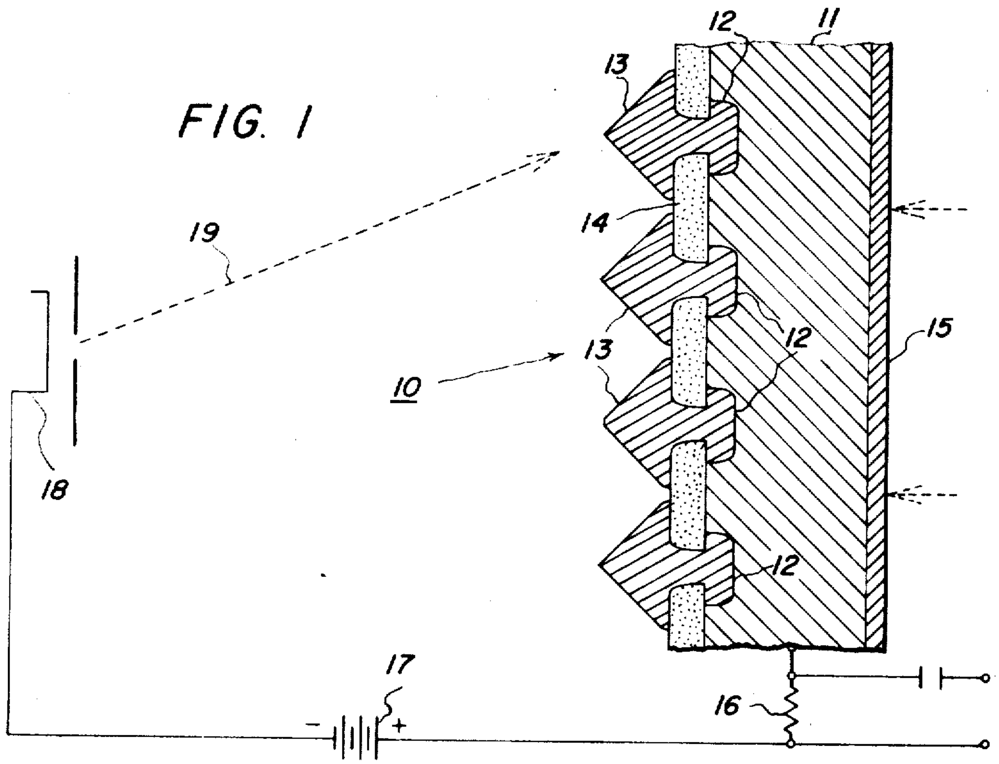

INVENTOR:
WILLIAM E. ENGELER,
by Jerome C. Squillaro
HIS ATTORNEY

SOLID STATE LIGHT SENSITIVE STORAGE ARRAY

The present invention is a continuation-in-part of my copending U.S. Pat. application, Ser. No. 845,435, now abandoned filed July 28, 1969 and relates to light sensitive storage devices, and more particularly, to camera tubes having semiconductor target structures.

In U.S. Pat. No. 3,011,089 to F. W. Reynolds, a light sensitive storage device useful as a target structure in a television camera tube is described. The device comprises a planar semiconductor substrate of n-type material with an array of p-type regions on one surface of the substrate to form an array of junction diodes in the substrate. The n-type region of the semiconductor substrate is biased at a fixed potential with respect to the cathode of camera tube and an electron scanning beam issuing from the cathode reverse-biases each diode to a voltage equal to the difference in potential of the substrate and the electron beam. In the absence of light impinging upon the n-type region, the diodes exhibit a relatively low leakage current.

With the application of light to the n-type substrate on the side opposite the scanning electron beam, the leakage current of diodes thus illuminated exhibit considerably greater leakage current. As the electron beam again scans the p-type surface to recharge each diode to beam potential, the amount of charge required for each diode equals the charge removed by the leakage current during the preceding scan period which was the result of the impinging light. The current required to recharge each diode is sensed through an external circuit and used to create a video signal which is proportional to the distribution of light intensity across the diode array.

As described in U.S. Pat. No. 3,403,284 to P. M. Buck et al., the Reynolds diode array had several drawbacks. In particular, the thickness of the n-type substrate had to be very thin to ensure that photon excited minority carriers could diffuse to the p-n junction before recombining with electrons. Additionally, the Reynolds device was difficult to fabricate because, in addition to the thin substrate, very accurate registration of the diode array was necessary since the scanning electron beam impinged successively on single p-type regions. In an effort to improve upon the Reynolds array, Buck et al. arranged the diode array so that the scanning electron beam impinged on several diodes simultaneously so as to void the registration problems of the Reynolds array. Additionally, Buck realized the need for shielding the n-type substrate from the scanning electron beam by an insulating coating so that only the p-type regions would be exposed to the beam. To prevent a charge buildup on the surface of the insulating coating, Buck et al found it necessary to overlay a major portion of the insulating film with a matrix conductor which was electrically insulated from each of the diodes and biased so as to drain electrons from the insulating film. This specific structure is very difficult to fabricate because two masks or patterns are required: one defining the area of the diodes and the other defining the conducting matrix. Since it is desirable to make the diodes very small, the problem of mask registration becomes exceedingly difficult. Accordingly, the solution proposed by Buck is not commercially desirable.

As described in U.S. Pat. No. 3,419,746 to Crowell et al., these problems were solved by employing, instead of a conductive coating, a semi-insulating layer over the insulating coating to moderate charge buildup on the insulating coating. The discharge time constant of the semi-insulating layer or resistive sea was necessarily greater than the frame time of the camera tube but substantially less than the discharge time constant of the insulating coating. Crowell et al. therefore selected materials having resistivity in the range of $3 \times 10^9$ ohm-centimeters to $3 \times 10^{10}$ ohm-centimeters such as silicon monoxide, antimony trisulfide, cadmium sulfide, and numerous other compounds. This solution to the charge buildup problem, however, represents a compromise between resolution and charge buildup. Specifically, resistivity of the semiinsulating layer must be low enough to conduct the charge buildup away from the target structure but yet not so low as to impair resolution in the scanning of light images incident upon the opposite surface of the n-type region. This compromise represents a serious problem in most applications, such as television camera tubes. Accordingly, there remains a great need for finding a solution to the charge buildup problem.

In accord with the instant invention, the foregoing problems are solved by employing a target structure including a diode array having an electrically conducting projection in contact with one electrode of each of the diodes; the projections extend above the surface of an insulating layer. The resultant array of projections exhibits a unique ability to intercept electrons in the scanning beam before they are able to strike the insulating layer and thereby prevent the charge buildup problem. Each projection is electrically isolated from each other projection so as to provide an array of self-registered projections.

Accordingly, it is an object of this invention to provide an improved electron beam information storage device useful in camera tubes.

Another object of the invention is to provide a light-sensitive storage device wherein the problems of charge buildup are substantially reduced if not completely eliminated.

Still another object of this invention is to provide a method for making an array of self-registered electrically conducting projections extending above and in contact with one surface of a diode array to prevent charge buildup problems thereon.

Briefly, these and other objects of the invention are attained in one embodiment of the invention wherein a target surface of n-type semiconductor material is coated on one surface thereof with an apertured insulating mask such as silicon dioxide which is photographically etched so as to contain an array of apertures exposing seleced regions of the n-type semiconductor. P-type semiconductor material is then selectively epitaxially grown through the apertures and above and along the insulating layer until projections of p-type material result. The p-type material is preferably grown by an iodine transport epitaxy process described in copending U.S. Pat. application, Ser. No. 636,911, filed May 8, 1967, by E. A. Taft, and copending U.S. Pat. application, Ser. No. 804,365, filed Feb. 25, 1969, by J. M. Sprague and D. L. Malcuit of common assignee as the instant application and are incorporated herein by reference. The p-type projections grown by this process on a 1, 0, 0 type plane, for example, produce substantially pyramidal shaped configurations which are particularly desirable in collecting electrons in the scanning beam before they hit the insulating layer.

In another embodiment of the invention the n-type semiconductor material exposed by the array of apertures in the insulating mask is covered with a metal in contact with the n-type semiconductor material and extending above and along the surface of the insulating layer to form an array of insulated metal islands projecting from each aperture. At the metal-semiconductor interface a Schottky diode is formed. Like the p-n junction diode, the Schottky diode is capable of information storage.

Figure 2:
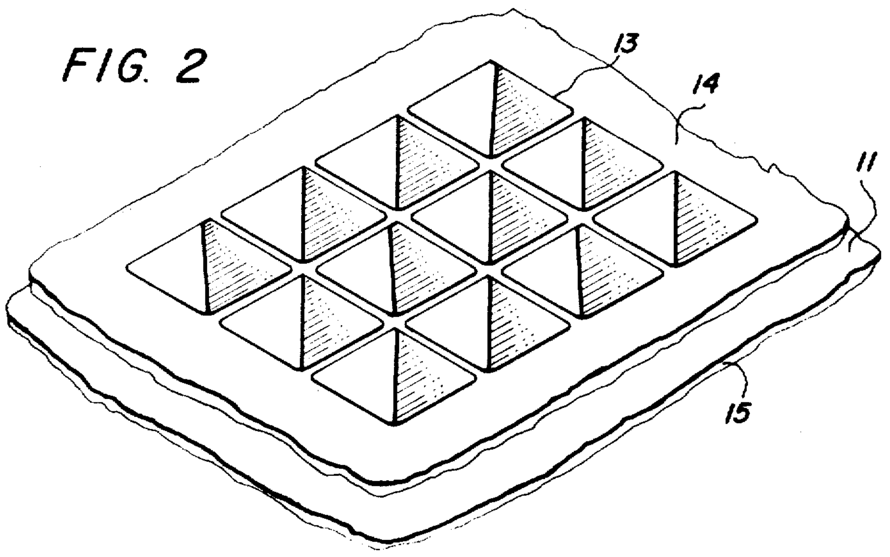

The features of the invention believed to be novel are set forth with particularity in the appended claims. The invention itself, however, both as to organization and method of operation, together with further objects and advantages thereof, may best be understood with reference to the following description taken in connection with the accompanying drawings in which:

FIG. 1 is a partial schematic view of the target structure, associated circuitry and camera tube in accord with one embodiment of invention; and FIG. 2 is an isometric view of the target structure illustrated in FIG. 1.

By way of example, the instant invention is described by reference to FIG. 1 wherein there is illustrated a target structure 10 comprising a semiconductive substrate 11 of n-type conductivity silicon, for example, provided with isolated regions 12 of opposite type conductivity silicon with a portion 13 thereof protruding above the surface of an insulating layer 14. The insulating layer 14 may, for example, be silicon dioxide, silicon nitride or any other useful material having similar characteristics. The protrusions or projections 13 are preferably formed by epitaxial growth such as with the iodine transport process described in the aforementioned Taft and Sprague applications; however, other selective expitaxial growth processes could likewise be used. Expitaxial deposition in accordance with iodine process results in crystal structure growth only from the nucleating apertures in the substrate 11. For the growth of substantially pyramid-shaped projections (i.e., projections having a four-fold symmetry), it is preferable to utilize a substrate having a crystal orientation in the 1, 0, 0 plane as defined by the Miller indices. This orientation may produce structures having four-fold symmetry other than those illustrated in FIGS. 1 and 2. For example, a four-fold structure having surfaces of 1, 1, 1 planes, similar to those illustrated in FIGS. 1 and 2, may be truncated by a set of 3, 1, 1 planes. This forms a substantially pyramidal shaped structure of lower profile. The exact geometry of the projections formed depend on the details of the specific epitaxial growth process used. Under some growth conditions, for example, the tops of these projections may be totally truncated, thereby producing a mesa structure with a top surface substantially parallel to the substrate.

It is understood, however, that the pyramid structure is illustrated merely by way of example and is not by way of limitation. For example, by changing the crystal orientation of the substrate 11, other geometric shaped projections can be obtained. Whereas, for example, growth from the 1, 0, 0 surface is preferred because it has the lowest surface-generated minority carriers, crystal growth from a 1, 1, 1 surface, which produces projections of the three-fold symmetry, may be utilized in conjunction with a dense hexagonal array of apertures. In either orientation, the expitaxial growth is continued until a substantial portion of the insulator layer is covered, leaving only small gaps between adjacent projections.

After expitaxially growing the desired projections 13, the target structure 10 is subjected to a diffusion process wherein the p-type regions 12 are diffused into the n-type region 11 so as to provide a high quality diode with low leakage. An antireflective coating 15 is then applied to the surface of the n-type semiconductor region 11 which may then be subjected to light images, for example. The antireflecting coating 15 may, for example, be a film of zinc sulfide approximately one-quarter wavelength thick for visible light. If desired, this may be followed by a hydrogen annealing step which further reduces surface-generation of minority carriers as is well known in the art.

The n-type semiconductor substrate 11 is connected through a load resistor 16 to the positive terminal of a bias source such as a battery 17, which has its negative terminal connected to a cathode 18 of the camera tube. An electron beam 19 emitted from the cathode 18 is electromagnetically or electrostatically scanned across the array of pyramid structures so as to charge the diodes with a reverse-bias voltage. Other essential elements of the electron beam tube such as deflection plates, focusing electrodes and grids are omitted for purposes of clarity.

As described above, light impinging on the n-type region 11 causes the diodes to discharge at a rate proportional to the intensity of the light image. On a subsequent scan of the electron beam, the current required to recharge the diode to its original reverse-bias voltage is therefore a measure of the light intensity of the image. This current creates a voltage drop through the load resistor 16 and subsequently used as a video signal.

Whereas the insulating material of the prior art target structure under electron beam scanning would adversely build up a charge equal to a potential of the scanning beam, the insulating layer 14 of the instant invention is not subjected to charge buildup because it is substantially covered by the projecting structures and the charge deposited thereon is drained off through the diode junction to the n-type semiconductor material.

FIG. 2 illustrates more clearly how the substantially pyramid-shaped projections 13 extend above the surface of the insulating layer 14 and cover a major portion thereof.

Although the invention has been described with reference to a specific embodiment in which a p-n semiconductor junction diode is used, it is understood that other diodes could likewise be used without departing from the spirit and scope of the instant invention. For example, a metal projection may be formed over each aperture exposing a semiconductor material whereby a Schottky diode is formed at the interface. By plating or other suitable techniques, projections having the desired configuration may be formed.

Having thus described the structural features of the instant invention, a specific example of a method for making the above-described structure is now presented.

EXAMPLE 1

A silicon single crystal having a 1, 0, 0 orientation is cut into a disk shaped wafer, lapped polished and etched to a thickness of 0.004 inch (100 microns). The substrate wafer is oxidized at 1150° C for 10 hours in pure dry $0_2$ to grow, a 6,000 A layer of $Si0_2$ on the surface of the wafer. This oxide is partly removed by etching in buffered hydrofluoric acid (one part 48 percent concentrated hydrofluoric acid, 10 parts 40 percent solution of ammonium fluoride) after masking a portion of the wafer with a photoresist patterned photographically in the conventional manner. An array of 8-micron diameter holes in the oxide on a 16 micron grid is formed in this manner. The grid is oriented along the 1, 1, 0 type directions which minimizes shorting between diodes. Photoresist is next removed by washing the wafer in hot (180° C) sulfuric acid for a few minutes followed by a washing in pure distilled water. The entire wafer is then etched in buffered hydrofluoric acid to remove a thin layer of surface oxide and washed in high purity water to remove any impurities from the surface of the oxide layer. This step helps prevent nucleation of silicon crystals on the oxide during epitaxial growth.

The wafer is next inserted between two susceptor disks in a vacuum reactor chamber. The upper disk serves as a source of p-type silicon (boron doped) which is transported to the wafer by an iodine vapor pressure of 1 mm. The lower susceptor is maintained at a temperature of 1,000° C while the upper susceptor is maintained at a temperature of 1,100° C. The transportation process is allowed to proceed a sufficient time, aproximately 10 minutes, to grow several microns of p-type silicon epitaxially on the exposed silicon surface. An array of substantially pyramidal shaped epitaxial crystals is thereby formed. The exact time is adjusted so that a maximum portion of the array surface is covered with a minimum of electrical shorts between diodes. It has been found that the growth proceeds at a slower rate near the juxtaposed diode surfaces so that the deposition time is not as critical as might be expected. This particular feature of the epitaxial growth process permits the diodes to be formed with exceedingly narrow spacing with a minimum of shorts.

The wafer is next diffused to drive a portion of the p-type impurities into the silicon wafer to a depth of approximately 1 micron. A portion of the oxide covering the reverse side of the wafer is then removed by etching and the wafer is assembled into a vacuum tube complete with the scanning electron beam structure as is conventionally used. Contact to the wafer is made by an indium ring. This produces a camera tube sensitive to infrared radiation. Improved response in the visible region of the spectrum may be obtained by diffusing a light n-type surface into the wafer and by thinning the central portion to approximately 20 microns in the conventional manner or by starting with an $n^+$-type wafer having an n-type layer epitaxially grown thereon. The $n^+$-type wafer material is then removed in the active regions of the device.

From the foregoing description it is readily apparent that the instant invention has several advantages over prior art storage devices. In particular, the charge buildup problem is substantially reduced if not completely eliminated. Additionally, as a result of the self-registered projections, the fabrication of economical high density diode arrays is made possible with the attendant improvement in resolution and sensitivity.

While the invention has been set forth herein with respect to certain particular embodiments and examples, many modifications and changes will occur to those skilled in the art. For example, whereas the invention has been described as being responsive to light images, obviously other mechanisms for selectively generating minority carriers could be employed, such as another electron beam or an X-ray beam.

What is claimed and is desied to be secured by Letters Patent is:

1. An electron beam storage device comprising a substrate of semiconductor material of one conductivity type having a first surface of a predetermined crystallographic orientation, a layer of insulating material having a plurality of apertures therein, each aperture extending from a first face to an opposed second face thereof, said first face of said layer being in intimate contact with said first surface of said substrate, a plurality of electrically conducting projections of semiconductor material of opposite conductivity type, each projection being an epitaxial extension of said substrate and extending from said first surface of said substrate through a respective aperture of said insulating layer and terminating beyond the plane of said second face of said insulating layer, each of said projections forming a rectifying diode with said substrate, means for reverse biasing said rectifying projections with an electrom beam, said projections being proportioned such that a substantial portion of said electron beam is intercepted by said projections during the scanning thereof.

2. The device of claim 1 in which said projections substantially cover said second face of said insulating layer, each of said projections being closed spaced and in insulated relationship to adjacent projections, and in which each of said projections extends a substantial distance beyond said second face of said insulating layer.

3. The device of claim 1 in which said projections are constituted of P-type conductivity semiconductor material.

4. The device of claim 2 in which extensions of said projections above said second face of said insulating layer are pyramid-shaped.

5. The device of claim 2 in which the extensions of said projections above said second face of said insulating layer are mesa-shaped.

6. The device of claim 2 in which the outlines of sections of said projections parallel to said second face of said layer are substantially identical and regular, adjacent edges of adjacent sections being substantially uniformly spaced.

7. The device of claim 1 in which said first surface of said substrate is a 1, 0, 0 plane as defined by Miller indicies.

8. The device of claim 1 in which said first surface of said substrate is a 1, 1, 1 plane as defined by Miller indices.

9. A target structure for an electron beam storage device comprising a substrate of semiconductor material of one conductivity type, an insulating layer in intimate contact with a surface of said substrate and having a plurality of apertures therein which expose selective portions of said substrate, a plurality of projections of semiconductor material, each projection having an end portion in contact with a respective exposed portion of said substrate, a body portion extending through a respective aperture of said insulating layer, and another end portion remote from the exposed portion of said insulating layer, each of said projections being constituted of opposite type semiconductor material to form a rectifying diode with said substrate and being an epitaxial extension of said substrate.

10. The target structure of claim 9 in which said projections substantially cover the exposed portion of said insulating layer and in which said other end portions of said projections lie a substantial distance beyond the exposed portion of said insulating layer.

11. The target structure of claim 9 in which said apertures are identical in size and arranged in an array, said array of apertures being set in relation to the crystalline orientation of the surface of said substrate in contact with said insulating layer such that said projections are identical in orientation and in which each projection is identically spaced in relation to adjacent projections.

12. The target structure of claim 9 in which said semiconductor material is silicon.

13. The target structure of claim 9 in which said substrate is of N-type semiconductor material and said electrically conducting material is P-type semiconductor material.

14. The target structure of claim 9 in which the end portions of each of said projections are identically symmetrical.

15. The target structure of claim 9 in which each of the end portions of said projections is a surface parallel to said second face of said insulating layer.

16. The target of claim 9 in which each of said projections is hexagonal in cross section and in which small gaps are provided between adjacent projections.

17. In combination, a substrate of semiconductor material having a first surface of a predetermined crystallographic orientation and a second surface spaced therefrom and opposed thereto, a layer of insulating material having a first face and a second face spaced therefrom and in opposed relation thereto, a plurality of apertures in said layer each extending from said first face to said second face thereof, said first face of said layer being in intimate contact with said first surface of said substrate, a plurality of electrically conducting projections of semiconductor material of opposite conductivity type, each of said projections being an epitaxial extension of said substrate and extending from said first surface of said substrate through a respective aperture of said insulating layer and terminating beyond said second face of said insulating layer, each of said projections forming a rectifying diode with said substrate, means for forming and directing an electron beam to scan the projections of said diodes to reversely biased said rectifying diodes, means for shielding said insulating layer from said electron beam including proportioning said projections to substantially cover said second face thereof and to extend a substantial distance beyond said second face whereby said rectifying diodes are reversely biased to a predetermined magnitude by the scanning of said diodes by said electron beam, means for projecting radiation representing an image to be recorded on said second surface of said substrate whereby each of said diodes is discharged from said predetermined magnitude to an extent corresponding to the extent of radiation received thereby and the scanning of said diodes producing a current flow in circuit with said substrate and said electron beam which varies in accordance with the radiation received by said diodes, means for developing a video signal in response to said current flow.

* * * * *